Nov. 3, 1953  J. W. L. KÖHLER ET AL  2,657,899
CYLINDRICAL VALVE BODY COMPRISING ONE OR MORE
APERTURES PROVIDED IN THE WALL THEREOF
Filed Dec. 17, 1949
FIG. 1
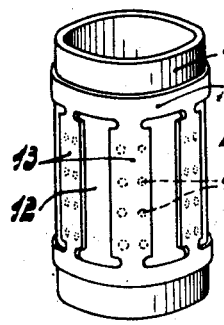
FIG. 2
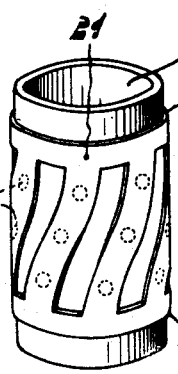
FIG. 3
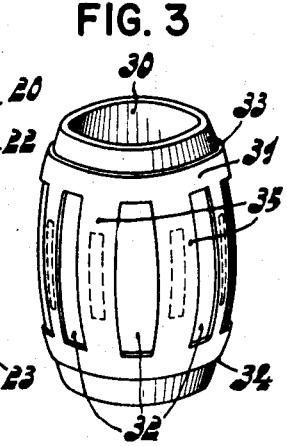
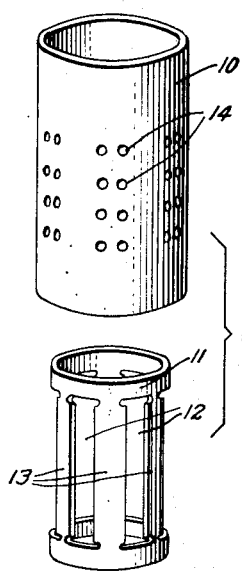
FIG. 4
*INVENTORS*
Jacob Willem Laurens Kohler
and August Albert Liebe
BY
AGENT Patented Nov. 3, 1953

2,657,899

UNITED STATES PATENT OFFICE 2,657,899

CYLINDRICAL VALVE BODY COMPRISING ONE OR MORE APERTURES PROVIDED IN THE WALL THEREOF

Jacob Willem Laurens Köhler and August Albert Liebe, Eindhoven, Netherlands, assignors to Hartford National Bank and Trust Company, Hartford, Conn., as trustee Application December 17, 1949, Serial No. 133,548
Claims priority, application Netherlands
December 31, 1948

7 Claims. (Cl. 251—122)

This invention relates to cylindrical valve bodies comprising one or more apertures provided in the wall thereof.

It is known to manufacture a valve by slipping a tube of rubber over a valve body having one or more apertures. A valve of this kind is frequently used in an inner tube of a bicycle. This valve has the property that the pressure required for opening the valve is comparatively high since the tube must be extended along its periphery.

Valves for use as self-opening valves in engines and pumps, for example, in hot-gas reciprocating engines, hot-gas turbines, compressors, compression-refrigerating apparatus or liquid pumps, however, as a rule, have to satisfy one or more of the following requirements.

1. A large passage is required.
2. The opening pressure must be small.
3. The valve in the closed position must be resistant to high differences in pressure.
4. The valve must close satisfactorily even if the pressure difference is small.
5. The valve must be capable of being opened and closed very rapidly, for example 3,000 times a minute.

These requirements prevent the known tube valve from being used as a self-opening valve, since both the opening pressure and the inertia upon opening and closing are unduly high for said purposes.

The object of the invention is to provide a cylindrical valve body, comprising one or more apertures in the wall thereof, suitable for use as a self-opening valve.

According to the invention, a cylindrical valve body comprising one or more apertures in the wall thereof, is characterized in that the aperture or apertures is or are closed by an elastic skin and that the skin having the shape of a strip and at least part of its surface engaging the wall of the valve body with a small pressure, at least one of the longitudinal sides of this strip being capable of being lifted from the wall of the valve body as a result of a difference in pressure on the sides of the skin. For satisfactory operation of the valve it is important that the height over which the strip-like skin is lifted upon opening should be comparatively small with respect to its length. It is thus ensured that the skin substantially need not be extended upon opening.

In order to promote satisfactory closing of the valve at a small pressure difference, it is desirable that the strip or the strips of the elastic skin should engage the wall of the valve body with a small pressure. This may be ensured in a simple manner if the valve body and the skin are such that, if there is no difference in pressure on the sides of the skin, a space is available between a strip and the wall of the valve body, whilst the longitudinal sides of this strip engage the wall. The wall of the valve body may have different shapes and may, for example, be plane or curved. In the latter case the skin may be provided either on the inner periphery or on the outer periphery of the wall.

In a simple arrangement, the section of a strip at right angles to the longitudinal direction may have in the unstretched position, a radius of curvature smaller than the radius of curvature of the wall in situ in the same direction, the concave side of the strip being adjacent the wall.

If the valve body comprises a plurality of apertures which cannot conveniently be covered by one strip, a plurality of apertures in the wall of the valve body may be closed by a plurality of strips, which are, at the short sides, integral with one another.

More particularly if the wall of the valve body comprises apertures distributed over a comparatively great length, it is possible that the natural frequency of the strip is too low in connection with the desired opening frequency, with the result that satisfactory closure could not be obtained. This disadvantage may be avoided if a plurality of strips, which are at the short sides, integral with one another, are aligned. In certain cases it may be desirable that the strips at some areas should permanently engage the wall of the valve body throughout or substantially throughout their width.

It is possible to construct the valve body to be barrel-shaped, in which event there is a curvature both in the transverse direction and in the longitudinal direction of the strip.

If the valve body is cylindrical or barrel-shaped the wall may be surrounded by a tubular skin comprising at least two apertures not extending to the ends of the skin, the intermediate strips covering one or more apertures of the wall.

The pressure at which the strip or strips engages or engage the wall is variable. This variation permits of varying the pressure difference at which the valve may open. The pressure against the wall may be varied by stretching the strip to a smaller or greater extent. This may be effected by moving the extremities of the tubular skin closer to or farther away from one another or by relatively turning the extremities so that the tubular skin provides helical strips. In the latter case it is also possible to provide the tubular skin with helical apertures in the unstretched condition.

As an alternative, the edges of the strips may be caused to engage the valve body with a small pressure if the tubular skin in the unstretched condition has an inner periphery smaller than the outer periphery of the valve body. In order to ensure satisfactory closure, it is possible to polish the wall of the valve body.

As mentioned above, the valve according to the invention may, as a rule, be used in those cases in which self-opening valves are usually employed. Particular advantages may, however, be afforded if a hot-gas reciprocating apparatus is provided with a valve according to the invention.

In closed-cycle hot-gas reciprocating apparatus, which term is to be understood to include hot-gas reciprocating engines, reciprocating refrigerators and heat pumps operating according to the reversed hot-gas engine principle, it is possible that working medium may leak out of the apparatus during operation. This results in a decrease of the power supplied or absorbed by the apparatus. If this power is required to remain constant, it is necessary that an amount of working medium should be supplied to the apparatus either periodically or continuously. It is advantageous to utilise the valve body according to the invention as a replenishment valve in hot-gas reciprocating apparatus, since this valve is capable of opening and closing very rapidly and furthermore it needs a small opening pressure only so that the valve may be opened and working medium may be supplied even when leakage of working medium from the engine is small.

For satisfactory operation of the valve it is advantageous that the skin should have a thickness such that it does not tear at the highest difference in pressure occurring, it being important that the apertures provided in the wall of the valve body have no unduly sharp edges in order to prevent cutting of the skin. Furthermore, in the interest of a satisfactory closure and period of life of the skin it is advantageous if the apertures are not unduly large.

The invention will now be explained more fully by reference to the accompanying drawing showing diagrammatically, by way of example, embodiments of a valve body according thereto.

Fig. 1 shows a cylindrical valve body having fitted over it a tubular skin having straight strips.

Fig. 2 shows a cylindrical valve body having fitted over it a tubular skin, having helical strips, and Fig. 3 shows a barrel-shaped valve body.

Fig. 4 illustrates an exploded view of the embodiment shown in Fig. 1.

Referring now to Fig. 1, a cylindrical valve body 10 has fitted over it a tubular skin 11 having an internal diameter slightly smaller than the outer diameter of the valve body. This skin is provided with substantially rectangular apertures 12, between which straight strips 13 are provided. The apertures do not extend to the ends of the tubular skin. The wall of the valve body 10 comprises apertures 14, which are adapted to be closed by the strips 13. It is to be noted that each section of strips 13 at right angles to the longitudinal direction thereof may have, in an unstretched condition, a radius of curvature smaller than the radius of curvature of a section of cylindrical body 10 adjacent thereto.

The edges of the strips may be lifted from the wall, and hence the valve opened, with a small excess pressure on the inner side of the strips. In certain cases it is possible that only one longitudinal side of a strip is lifted from the wall. If, however, the pressure on the outer side of the skin increases, so that it becomes greater than the pressure on the inner side, the valve is closed due to the edges of the strips engaging the wall, the closure becoming tighter with increase in pressure difference as a greater surface area of the strips engages the wall. The pressure at which the skin engages the wall of the valve body is dependent upon the diameter of the tubular skin.

It may readily be ensured that the valve closes satisfactorily even at a small pressure excess on the outer side of the skin and that the pressure excess on the inner side of the skin for opening the valve may also be small.

In Fig. 2 a cylindrical valve body 20 has fitted over it a tubular skin 21, the inner diameter of which is at the most equal to the outer diameter of the valve body. The tubular skin 21 has helical strips, which may be formed either by providing helical apertures or rectangular apertures in the tubular skin, in the latter case the extremities 22 and 23 of the skin are turned slightly with respect to one another so that the strips are helical. The apertures 24 in the wall of the valve body may, if desired, likewise extend helically in the wall of the valve body. The pressure of the strips on the valve body with equal pressures on the inner and outer sides of the strips is variable by moving the extremities 22 and 23 of the skin closer to or farther away from one another, so that the helical strips are more or less extended and thus engage the wall of the valve body with a greater or smaller pressure. Similarly to the embodiment shown in Fig. 1, each section of the helical strips of tubular skin 21 at right angles to the longitudinal direction thereof may have, in an unstretched condition, a radius of curvature smaller than the radius of curvature of a section of cylindrical body 20 adjacent thereto.

A barrel-shaped valve body 30 is shown in Fig. 3 and has fitted over it a tubular skin 31, which in the unstretched condition has a diameter equal to the smallest outer diameter of the part of the body 30 to be covered by the skin. The tubular skin is provided with apertures 32 which do not extend to the ends 33 and 34 of the skin. The strips 35 thus formed cover apertures in the wall of the valve body. If it is desired to vary the pressure of engagement, the extremities 33 and 34 may be moved closer to or farther away from one another. A section at right angles to the axis of the valve body may, for example, be a circle, an ellipse or a polygon. Furthermore, it is possible for the valve body to be constituted by a segment only of a cylindrical body, the apertures preferably being provided in the curved portion of the wall. Similarly to the embodiments shown in Figs. 1 and 2, each section of strips 35 of tubular skin 31 at right angles to the longitudinal direction thereof may have, in an unstretched condition, a radius of curvature smaller than the radius of curvature of a section of barrel-shaped body 30 adjacent thereto.

In certain cases it may be important that the skin should be clamped in position on the wall of the valve body.

What we claim is:

1. A valve body comprising a wall member, an aperture in said wall member, an elastic skin member having ends continuously in engagement with the said wall member and a strip between said ends normally closing said aperture, the longitudinal sides of said strip, taken in the direction of the wall axis, also engage the wall member with a small pressure, but are capable of being lifted from said wall when a pressure difference is established on the sides of the skin, the section of the strip at right angles to the longitudinal direction in the unstretched condition having a radius of curvature smaller than the radius of curvature of a section of the wall, the concave side of said strip section being adjacent said wall so that said strip and said wall enclose a space therebetween.

2. A valve body comprising a wall member, a plurality of apertures in said wall member, an elastic skin member around said wall member and having ends continuously in engagement with the said wall member, a plurality of strips between said ends normally closing said apertures, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction in the unstretched condition having a radius of curvature smaller than the radius of curvature of a section of the wall adjacent thereto.

3. A valve body comprising a wall member, a plurality of apertures in said wall member, a tubular elastic skin member having ends continuously in engagement with the said wall member, a plurality of elongated openings in said skin member extending short of said ends forming a plurality of strips between said ends normally closing said wall apertures, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction in the unstretched condition having a radius of curvature smaller than the radius of curvature of a section of the wall adjacent thereto.

4. A valve body comprising a wall member, a plurality of apertures in said wall member, an elastic skin member around said wall member and having annularly slidable ends continuously in engagement with the said wall member, a plurality of helical strips between said ends normally closing said apertures, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction in the unstretched condition having a radius of curvature smaller than the radius of curvature of a section of the wall adjacent thereto.

5. A valve body comprising a tubular wall member, a plurality of apertures in said wall member, an elastic tubular skin member around said wall member and in an unstretched condition having an inner periphery smaller than the outer periphery of the valve body, said skin member having ends continuously in engagement with the said wall member, a plurality of strips between said ends normally closing said apertures, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction of the unstretched condition having a radius of curvature smaller than the radius of curvature of a section of the wall adjacent thereto.

6. A valve body comprising a barrel-shaped wall member, a plurality of apertures in said wall member, an elastic skin member around said wall member and having ends in slidable engagement with the said wall member, a plurality of strips between said ends normally closing said apertures, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction in the unstretched condition having a radius of curvature smaller than the radius of curvature of a section of the wall adjacent thereto.

7. A valve body comprising a barrel-shaped wall member, a plurality of apertures in said wall member, an elastic skin member around said wall member and having free ends continuously in engagement with the said wall member, a plurality of strips between said ends normally closing said aperture, the longitudinal sides of said strips, taken in the direction of the wall axis, also engage the wall member with a small pressure, but are capable of being lifted from said wall when a pressure difference is established on the sides of the skin, the section of each strip at right angles to the longitudinal direction in the unstretched condition having a radius of curvature smaller than the radius of curvature of a section of the wall adjacent thereto, the distance between the free ends of said skin member being adjustable to control the pressure difference necessary to lift said longitudinal sides of said strip.

JACOB WILLEM LAURENS KÖHLER.
AUGUST ALBERT LIEBE.

References Cited in the file of this patent

UNITED STATES PATENTS

| Number | Name | Date |
|---|---|---|
| 1,326,445 | Fewlass | Dec. 30, 1919 |
| 1,800,066 | Glass | Apr. 7, 1931 |
| 1,968,805 | Belyavin | Aug. 7, 1934 |